United States Patent [19]

Degginger et al.

[11] 4,098,943
[45] Jul. 4, 1978

[54] FIBER REINFORCED MULTI-PLY STAMPABLE THERMOPLASTIC SHEET

[75] Inventors: Edward R. Degginger, Convent Station; Michael P. Dellavecchia, Sparta; Albert H. Steinberg, Morris Plains, all of N.J.

[73] Assignee: Allied Chemical Corporation, Morris Township, Morris County, N.J.

[21] Appl. No.: 616,732

[22] Filed: Sep. 25, 1975

[51] Int. Cl.² .............................................. B32B 5/16
[52] U.S. Cl. .................................... 428/283; 156/309; 156/324; 428/284; 428/285; 428/288; 428/295; 428/297; 428/298; 428/302; 428/409; 156/244.12
[58] Field of Search ...................... 156/304, 244, 324; 428/247, 251, 409, 285, 286, 287, 300, 301, 302, 303, 323, 325, 426, 220, 293, 295, 183, 297, 298

[56] References Cited

U.S. PATENT DOCUMENTS

| 3,416,990 | 12/1968 | Robinson | 428/441 |
|---|---|---|---|
| 3,499,820 | 3/1970 | Desaulniers | 428/323 |
| 3,616,130 | 10/1971 | Rogosch et al. | 156/309 |
| 3,664,909 | 5/1972 | Ackley | 428/303 |
| 3,674,589 | 7/1972 | Schaab et al. | 156/245 |
| 3,676,249 | 7/1972 | Lemelson | 156/244 |
| 3,684,645 | 8/1972 | Temple et al. | 428/220 |
| 3,687,764 | 8/1972 | Rogosch et al. | 156/309 |
| 3,709,773 | 1/1973 | Hall | 156/244 |
| 3,788,923 | 1/1974 | Soliman | 156/309 |

*Primary Examiner*—James J. Bell
*Attorney, Agent, or Firm*—Patrick L. Henry; Ernest D. Buff

[57] ABSTRACT

Reinforced thermoplastic polymer composite sheets, formable into smooth, shaped objects in a stamping process. The characterizing constitutents of the composite sheet are: (1) a first layer of thermoplastic resin containing short glass fibers and a mineral filler such as kaolin, (2) a backing reinforcing layer comprising a long glass mat encased in a resin matrix and (3) optionally a third layer similar to said first layer.

10 Claims, 4 Drawing Figures

FIBER REINFORCED MULTI-PLY STAMPABLE THERMOPLASTIC SHEET

BACKGROUND OF THE INVENTION

It is known that many thermoplastic polymers can be formed into shaped objects by various sheet metal forming techniques such as deep drawing, stretch forming, stamping, forging, cold extrusion, etc. These forming processes are economically very attractive because it is possible to achieve rapid production rates, e.g., rates that exceed one item a minute or even faster.

Unfortunately, reinforced thermoplastic parts prepared by these processes tend to exhibit poor surface characteristics such that they are unacceptable for large automotive exterior surfaces. In order to overcome these deficiencies, sheets and processes such as those disclosed in U.S. Pat. No. 3,684,645 and copending application Ser. No. 564,019, filed Apr. 1, 1975 now U.S. Pat. No. 4,044,188, entitled Stampable Thermoplastic Sheet Reinforced with Multilength Fiber, were developed.

Generally in this art, a thermoplastic sheet, reinforced with a glass mat type of reinforcement is preheated in an oven to above the softening point of the resin. The heated blank is transferred to the matched metal dies of a stamping press, and stamped in a modified mechanical or rapid-closing hydraulic press or the like. The formed part is then removed or ejected from the matched dies. The residence time in the mold is 20–80 seconds or less. The forming process can be separated into the following distinct stages.

1. Preheat of sheet or blank.
2. Transfer to the rapid-stamping press.
3. Stamping under pressure for a predetermined time.
4. Removal or ejection from the press.

In stage 1, the composite sheet or blank is heated in a radiant, dielectric, infrared, convection, or vacuum oven or combination of ovens or similar heating source to a temperature above the melting point but below the decomposition point of the thermoplastic resin component of the blank.

In stage 2, the hot blank is transferred to a mold placed in a stamping press, wherein the mold or set of dies can impart the desired configuration of the final product to the sheet or blank. The mold is maintained at a temperature between room temperature (23° C.) and approximately 160° C. or more, depending on the polymer constituent of the sheet and upon the desired stamping characteristics.

In stage 3, the press is rapidly closed for a period of time sufficient to cause the blank to conform to the exact shape of the mold and to cool and/or crystallize sufficiently to allow part removal without distortion.

In stage 4, the molded article is removed from the mold.

It will be recognized that stamping parameters such as pressure requirements, residence time in the mold, preheat temperature, mold temperature, etc., are dependent upon the sheet composition, thickness, part complexity, etc.

Glass mat reinforced sheets of this kind as provided heretofore also suffer from certain disadvantages. Specifically, the following deficiencies have been encountered in prior art compositions:

Surface Finish: Prior art compositions usually contain 30 to 50% by weight of glass mat. Such an amount is required in order to impart high mechanical strength properties, high modulus, and sheet integrity during the preheat and transfer stages of the rapid stamping cycle.

A substantial amount of glass mat is needed not only to yield good mechanical strength properties in the final stamped part, but also to retain sheet integrity during the preheat and transfer stages of the rapid stamping process. However, high concentration of glass mat of quantity needed to provide the necessary mechanical strength and to retain the integrity of the sheet when it is heated tends to produce a poor surface finish on the final stamped part. For application such as automotive exterior parts (fenders, hoods), appliance housings, furniture components, etc., a smooth, imperfection-free surface is mandatory.

Prior attempts to remedy this problem as set forth in above noted U.S. Pat. No. 3,684,645 and copending application Ser. No. 564,019, have led to sheet, which though apparently smooth, fails to pass the visual inspection tests to which finished painted parts are normally subjected in the automotive industry. One such test is to view the reflection of a fluorescent light in the painted part to determine if the surface is wavy, albeit smooth. If the surface is wavy, the part is rejected. Also, a poblem has been found with "show-through" of the long glass mat which is again a visual test applied to the painted part.

SUMMARY OF THE INVENTION

In accordance with the invention we have discovered certain novel sheet compositions and method of making such sheet compositions which are reinforced with glass fibers of at least two different forms. These sheets have the advantage of relative ease of fabrication, can be readily formed in a stamping process and yield products of superior surface quality and mechanical properties. In particular, the compositions of this invention yield products whose properties are uniform on a micro-scale because of improved dispersion of a major portion of the fibrous reinforcement phase. The compositions also possess more uniform properties in finished parts because of a decreased probability of glass fiber-resin separation or "bridging" across small holes, depressions, corners, radii, etc. The compositions herein described also possess a highly improved surface quality because of (a) the orientation of short fibers in the plane of the sheet, (b) the encasement of the glass mat in a thermoplastic resin matrix, and (c) the resultant reduced prominence of glass mat fiber strands at the surface of the sheet composition.

Specifically, the present invention contemplates a smooth surfaced thermoplastic composite laminated sheet being essentially free of surface waveyness and long glass show-through, comprising, in terms of percent by weight of each layer (a) at least one layer comprising from about 40 to 70%, preferably 45 to 65% of a synthetic thermoplastic polymer, about 0 to 50%, preferably 10 to 30% of a particulate filler, and 0 to 35%, preferably 5 to 25% short glass fibers arranged generally parallel to the plane of the sheet surface, (b) a reinforcing layer adjoining said one layer comprising 60 to 95%, preferably 60 to 85% of synthetic thermoplastic polymer, a long glass fiber mat having a weight ranging from 5 to 40%, preferably 15 to 40%, and particulate fillers ranging from 0 to 40%, said mat being substantially encased in a matrix of the thermoplastic polymer, said reinforcing layer being essentially free of short glass fibers.

Also, in accordance with this invention, a process is provided comprising the steps of (a) blending and extruding a first sheet layer comprising from about 40 to 70% of thermoplastic resin, about 0 to 50% of a particulate filler and 0 to 35% short glass fibers arranged in a plane generally parallel to the sheet surface, (b) polishing same in a polished and gauged roll stack, (c) blending and extruding a second sheet layer comprising from about 60 to 95% of synthetic thermoplastic resin and from 0 to 40% particulate filler, but being essentially free of glass fibers, (d) feeding said first sheet, said second sheet and a long fiber glass mat into the nip of a set of laminating rolls while the polymer of the second sheet is still in a molten condition, the clearance between the rolls being substantially less than the thickness of the sheets and glass mat being fed to the nip of said rolls, whereby the long glass mat is impregnated into said second sheet and said first and second sheets are laminated into a smooth multi-ply product.

DESCRIPTION OF THE PREFERRED EMBODIMENTS

Figure 1:
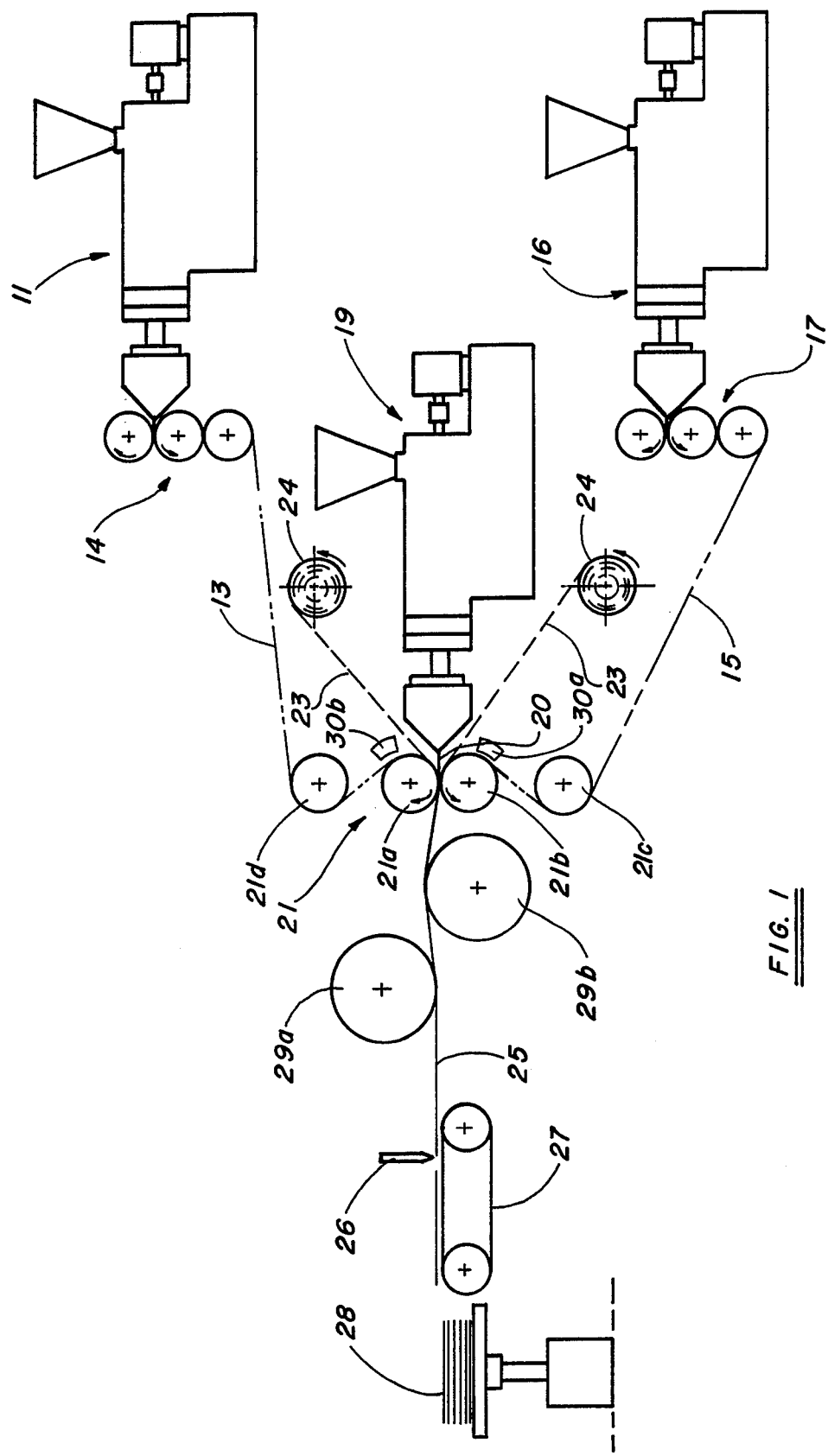
FIG. 1 illustrates schematically a system for producing the composite sheets of this invention.

Referring to the drawings, a first extruder 11 receives a mixture of thermoplastic resin such as nylon, short glass and particulate filler and extrudes same through a die into a filled sheet 13 which is polished and gauged in a polishing stack 14. A similar thermoplastic sheet 15 is produced from extruder 16 through polishing stack 17. A third extruder 19 feeds a thermoplastic sheet 20 into laminating rolls 21 simultaneously with sheets 13 and 15, and long glass mat or mats 23 which are fed from roll or rolls 24. It is important that the sheet 20 be in a molten condition at the point where the sheets converge on the rolls 21 and that the sheets 13 and 15 be substantially below the melting point of the polymer so that the force of the rolls 21 forces the glass mat or mats 23 into the molten sheet 20 and not into sheets 13 or 15. In this manner, the long glass reinforcing mat becomes substantially encased in the sheet 20 and does not effect surface qualities of sheets 13 and 15 when they are laminated together. The sheet is subsequently cut with cutter mechanism 26 on conveyor 27 and fed to stacking table 28.

An important feature of this embodiment of the method is the processing conditions at the roll stack 21.

The clearance between rolls 21a and 21b is substantially less than the combined thickness of the four components 13, 15, 20 and 23. (Thickness of mat 23 is measured under little or no compression.) This is necessary to effect: an impregnation of mat 23 into sheet 20, and (b) lamination of the resulting product to sheets 13 and 15.

The temperature of the sheet 20 should be substantially above (at least 30° C. above) the thermoplastic melting point to provide adequate residual heat to allow for cooling of sheet 20 between the extruder die 30 and the roll stack 21 and allow the glass mat to be uniformly impregnated therein. Preferably, the sheet is 50° to 100° C. above the polymer melting point at the point of convergence between rolls 21(a) and 21(b). Heating the sheet to a higher temperature in the extruder may cause degradation of the polymer and results in excessive energy consumption. Lower temperatures result in inadequate impregnation of the mat 23 in sheet 20, including inadequate flow of the polymer into the interstices of the glass mat, inadequate bonding of sheets 13 and 15 to sheet 20, and inadequate binding of the fibers to the polymer resulting in poor physical properties in the final product.

For the same reasons, the pressure applied by rolls 21(a) and 21(b) should range from 150 to 400 pounds per linear inch to ensure adequate bonding of the layers and impregnation of the glass mat 23 into sheet 20. Higher pressures require much sturdier equipment. For example, rolls 21a and 21b would need larger diameter, heavier walls and bearings of greater load bearing capacity to prevent excessive deflection of rolls 21a and 21b. Excessive deflection of rolls 21a and 21b can result in non-uniform impregnation of glass mat 23 into sheet 20, non-uniform bonding of sheets 13 and 15 to sheet 20, non-uniform surface appearance, and non-uniform thickness of sheet 25.

Sheet 13 after leaving polishing stack 14 contacts roll 21d and then roll 21a. Sheet 15, after leaving polishing stack 17 contacts roll 21c and then roll 21b. Rolls 21c and 21d are maintained at a temperature close to but below the polymer melting point, preferably 5° to 40° C. below the polymer melting point. Rolls 21a and 21b are maintained at a temperature 10° to 70° C. below the polymer melting point. The temperatures of rolls 21a, 21b, 21c and 21d and infrared heaters 30a, 30b are adjusted so that the temperature of sheets 13 and 15 is high enough to achieve strong bonding of sheets 13 and 15 to sheet 20, but not so high as to result in sticking of sheet 13 to roll 21d or 21c or of sheet 15 to roll 21a or 21b or in degradation of the surface quality of sheet 25.

Cooling rolls, such as rolls 29a and 29b, can be used to quickly lower the temperature of laminate 25 sufficiently for easy cutting on cutter mechanism 26.

Figure 2:
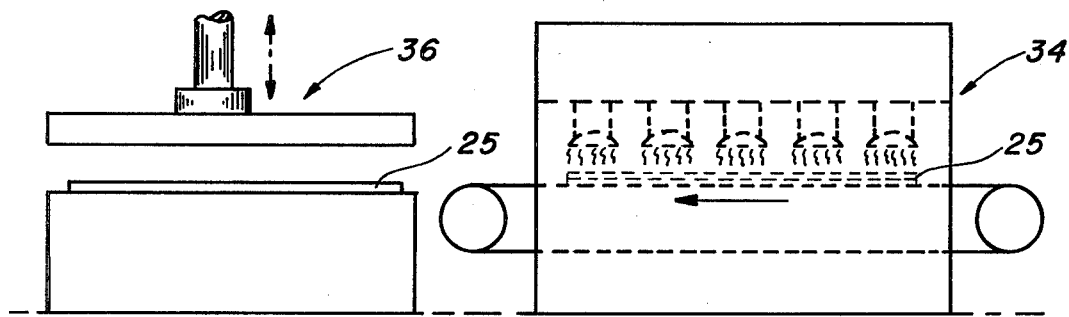
FIG. 2 illustrates a stamping press for sheets of this invention.

An alternate, less preferred embodiment, would have the glass mat 23 impregnated into sheet 20 in a separate operation with subsequent lamination to sheets 13 and 15 in a laminating process where the layers are bonded under heat and pressure or during the heating and stamping operation where different laminates could be assembled depending on the part to be produced. An example of the latter method is shown in FIG. 2. A sandwich built from layers 13, 15 and a sheet 20 impregnated with mat 23 is heated in oven 34. This heating step serves to condition the sheets for stamping in press 36 and also to effect a slight bond between the layer interfaces. The subsequent pressure in press 36 has the effect of simultaneously laminating the layers and forming the resulting composite into a part.

Figure 3:
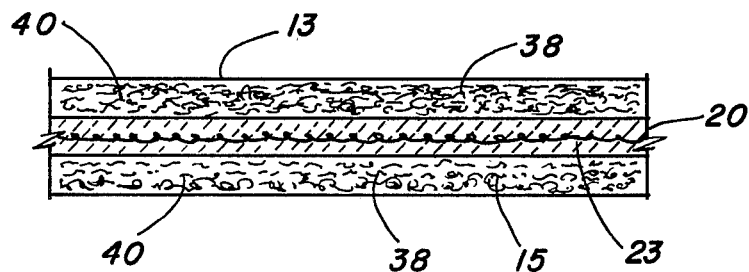
FIG. 3 illustrates a schematic cross section of a composite sheet of this invention.
Figure 4:
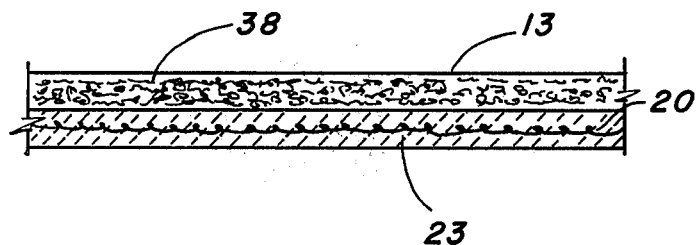
FIG. 4 illustrates an alternate construction.

The composite sheet produced is illustrated in FIG. 3. It comprises: (a) one or more surface layers containing 45 to 65% polymer, 5 to 25% of well dispersed randomly oriented short glass fibers and 10 to 30% particulate filler, (b) a reinforcing layer consisting essentially of a 15 to 40% of long glass reinforcing mat encased in a thermoplastic polymer matrix such that there is essentially no migration of the long glass fibers to the surface layer 13 and no migration of the short glass fibers to the reinforcing layer 20.

The stampable composite sheet may have one or two defect-free surfaces as shown in the attached drawings. The short, well dispersed fibers 38 are randomly but predominantly two-dimensionally oriented in the plane of the sheets 10 and 12. That is, more than 50% of the fibers are aligned substantially parallel to the plane of the sheet. Such orientation of the short fibers is easily achieved in extrusion, rolling, drawing or similar orientation-inducing processes, and is preferably for purposes of this invention in achieving smooth surfaced sheets.

The thickness of the surface sheet blank should be at least 30 mils. A thinner surface sheet will permit the pattern of the reinforcing mat 23 of zone 2 to be visible on the surface of the composite sheet 25. The minimum thickness of sheet 20 is determined by the need to impregnate glass fiber mat 23 and is about 20 mils per ounce/square foot of glass fiber mat. If thickness of sheet 20 is less than about 20 mils for each ounce per square foot of glass fiber mat 23 then glass fiber mat 23 is likely to be non-uniformly impregnated into sheet 20 and composite sheet 25 is likely to have non-uniform properties.

The thermoplastic polymers which can be used in forming the sheet compositions which may be stamped into shaped objects in accordance with the methods of the present invention include the various thermoplastic materials normally used in injection molding, extrusion, vacuum forming, blow molding, fiber spinning, or similar thermoplastic processing techniques.

Suitable thermoplastic resinous materials which may be utilized in making the composite laminate of the invention include, for example, the alkenyl aromatic resins typified by polystyrene, styrene copolymers, blends and graft copolymers of styrene and rubber and the like. The invention may be practiced utilizing polyvinylchloride or vinylidene chloride copolymers (sarans).

Particularly desirable thermoplastics in such compositions are the polyamides, that is, polymers having regularly recurring amide groups as an integral part of the main chain. Polyamides such as nylon 6,6 (a condensation product of hexamethylene diamine and adipic acid) and nylon 6 (the polymerization product of e-aminocaproic acid or e-caprolactam) are examples of two polyamides or nylons.

Polyolefins may also be employed, including polyethylene, polypropylene, polymethylpentene and copolymers thereof.

Additional polymers which can be utilized include polyurethane resins, polysulfone resins, polycarbonate resins and linear polyester resins such as polyethylene terephthalate and polybutylene terephthalate; cellulose ester resins such as cellulose acetate, and cellulose propionate; halogenated olefins and polyacetal resins.

Also included in the term "polymer" are blends or copolymers of two or more polymeric materials. Illustrative of such polymers are polyethylene/polypropylene, ethylene-acrylic acid-vinylacetate terpolymers and the like.

The glass fiber used in making the fiber mat is preferably used in the form of glass fibers or strands or bundles which are at least about 1½ inch to continuous in length. The glass may be used in the form of filament, strand, thread, yarn, roving, non-woven, scrim, and the like. The strands or fiber comprising the reinforcing mat are held together either by resinous adhesive binders (thermosetting or thermoplastic resins) or by "needling" or by the mechanical interaction of the randomly patterned web-like structure.

The individual glass strands in the mat are comprised of about 2 to 400, preferably 5 to 120, filaments per strand. Each filament is about 0.00030 to about 0.001 inch, preferably 0.00035 to 0.00085 inch in diameter. The glass mat comprising the reinforcing phase may have a weight of from 0.3 to 10 ounces per square foot.

Glass mat is readily distinguishable from other forms of fibrous reinforcement because of the random, web-like, or swirl arrangement of the fibers. Glass mat is also readily distinguishable from the short chopped fiber reinforcement which comprises a third discrete and critical aspect of the composite sheet.

The short glass fiber reinforcement of the third phase is at least about 0.01 inch in length in the final product. These short lengths of fibrous reinforcement are obtained because of the characteristics of the processing apparatus used to compound or blend this reinforcement with the thermoplastic resin. For example, if fibers ⅛ inch or longer are placed in the feed hopper of a single screw extruder along with the resin, the fibers will ordinarily be broken down into lengths shorter than the original ⅛ inch starting length because of abrasion, shear, turbulence, and mechanical work performed upon the fibers. Longer lengths (e.g., means lengths longer than 0.010 inch in a major portion of the short fiber reinforcement) may be retained by minimizing the amount of shear or mechanical breakdown of fiber length, with some sacrifice in homogeneity or prolonged processing times although lengths greater than ¾ inch are not desirable for the object of this invention since they must flow into ribs, etc. Another processing machine which may be used to blend and/or manufacture the short fiber filled resinous sheet is a twin screw extruder. In this case, the filamentary reinforcing material may be added to the nip of agitating heat plastified polymer between the screws through a feed port such as a volatile (vent) port. In the latter case, the filamentary reinforcing material may be fed to the twin screw extruder in the form of yarn or roving, and the short fiber lengths would be obtained by the mechanical breakup performed by the mixing action of the screws.

Glass fibers as normally used for reinforcement of thermoplastics may be treated or coated with a sizing composition. Standard sizing agents usually consist of several components, each of which possesses a distinct function. For example, a binder or film former gives the glass fiber strand integrity for workability and prevents fuzzing and aids in distribution of the sizing agent; a lubricant prevents destruction of the strand by abrasion of the individual filaments against each other and against fiber handling equipment; a coupling agent assists in obtaining greater abrasion between the glass fibers and the polymeric resin yielding improved strength characteristics; an emulsifying or dispersing agent allows sufficient dissolution of the various ingredients in the required carrying agent (frequently water) and improves compatibility between the various ingredients. In addition, pH adjusters, antistatic agents, wetting agents and surfactants are also often added to sizing formulations. Ordinarily, organosilicon compounds may suitably be employed as coupling agents. For example, halogenated or non-halogenated vinyl and alkyl containing, alkylalkoxy, alkenyl, aminoalkyl, aminoalkoxy, acyloxy, alkenyl acyloxy and similar silanes, their hydrolysis products and polymers of the hydrolysis products are suitable for such use. Formulations of this kind and methods of use are known to those skilled in the art.

The fourth constituent of the improved thermoplastic sheet material herein described in particulate filler. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical propeties are achieved if the filler material has a Young's modulus of $10^7$ psi or greater and at least a Young's modulus twice as great as that of the polyamide. Examples of fillers included in these categories are alumina, aluminum hydrates, feldspar, asbestos, talc, calcium carbonates, clay, carbon black, quatz, novaculite and other forms of silica, kaolinite, bentonite, garnet, mica, saponite, beidellite, calcium oxide, calcium hydroxide, etc. The foregoing recited fillers are illustrative only and are not meant to limit the scope of fillers that can be utilized in this invention. Adhesion promoting agents or coupling agents may, of course, also be utilized on the particulate filler phase.

The particulate filler may be added to the molten thermoplastic resin before, during, or after the addition of the short glass fibers to the resin. Thus, for example, filler and resin pellets may be fed to the feed hopper of a single screw extruder; the mixture is blended and conveyed towards the die. Short glass fibers can be added to the molten mixture at a vent hole or other such opening downstream of the feed hopper, and the mixture then extruded into pellets, or preferably, directly into sheet of the appropriate thickness for lamination with the glass mat reinforcement. In the extrusion process, the short fibers will emerge oriented randomly in the plane of the extruded sheet.

Other minor additives which may be of value in sheet formulations include antistatic agents, plasticizers, lubricants, heat and light stabilizers, or other similar processing aids and adjuvants.

Each of these four primary constituents performs a specific function within the composite material. The thermoplastic resin is, of course, the matrix which binds the other constituents together. As the matrix, the resin influences the mechanical and physical properties of the composite sheet. If a stamped product having an extremely high thermal resistance is required, for example, a nylon or linear polyester would be utilized as the matrix rather than polyethylene or polypropylene. If an extremely high impact resistance was required, for example, an impact resistant styrene copolymer or polycarbonate may be used rather than polystyrene or a more brittle linear polyester.

While composites without filler may be formed, the most desirable sheets include filler.

The functions of the particulate filler are: (1) to increase the modulus and stiffness of the composite sheet and (2) to provide a more economical composition.

The functions of the short fiber reinforcement are: (1) to increase the sheet stiffness and mechanical strength (2) to increase the resin-phase melt viscosity and (3) to compensate for the low content of the relatively long glass mat reinforcement (4) to allow flow of a reinforced plastic mixture into small holes, bosses, ribs, apertures, etc., during stamping and (5) to yield an improved surface in which most short dispersed fibers are oriented and lie in the plane of the sheet. The enhanced flow into small openings, bosses, ribs, etc., avoids fiber-resin separation, property non-uniformity due to bridging, and improved formability of complex stamped parts. In addition to the ability to form relatively narrow reinforced ribs, bosses, or similar sections, because of flow or short fibers into such sections, the high melt viscosity of the resin-filler-short fiber mixture aids in promoting uniformity of properties. Furthermore, because of the generally enhanced moldability of the present compositions, longer, thinner and more complex configurations or parts can be molded than heretofore known.

The short fibers oriented parallel to the plane of the sheet (in distinction to perpendicular to the plane of the sheet) result in a smooth surface free of glass mat and projecting fiber ends.

The present invention is more particularly described in the following examples which are intended as illustrative only since numerous modifications and variations therein will be apparent to those skilled in the art.

Shaping of the sheet was accomplished in a deep drawing press which has a polished steel die-set to produce 5-inch diameter cylindrical cups. The temperature of the polished steel die set was adjusted by means of electric heaters, and was maintained at approximately 140° C. The steel molds used were highly polished and chrome-plated (mirror finished).

The preheated sheet was transferred to the stamping press, and stamped at a pressure of 800 psi maintained for 10 seconds. The stamped part was cooled to room temperature, maintained at room temperature for 24 hours, and the flat bottom of the cup was then cut out for surface roughness testing.

EXAMPLE

Nylon 6 resin is blended with 25% short glass fibers and 15% kaolin in extruder 11 and extruded into sheet 13. A sheet 15 of similar composition is extruded by extruder 16. Both are brought together with glass mat 23 and molten sheet 20 at the nip of laminating rolls 21a, 21b. The mat 23 is impregnated into sheet 20 to form a middle reinforcing sheet comprising 75% nylon and 25% glass mat. The resulting sandwich is laminated and finished in the nip of rolls 21a, 21b and on rolls 29a, 29b. The resulting sheet is cut into discrete blanks and stored.

Having described the general nature and specific embodiments of the present invention, the following is claimed.

1. A smooth surfaced thermoplastic composite laminated sheet being essentially free of surface waviness and long glass show-through, comprising, in terms of percent by weight of each layer:
    (a) at least one layer comprising from about 40 to 70 percent of a synthetic thermoplastic polymer, a particulate filler present in an amount up to a maximum of about 50%, and 5 percent to 35 percent short glass fibers having a length ranging from 0.01 to ¾ of an inch and arranged generally parallel to the plane of the sheet surface,
    (b) a reinforcing layer adjoining said one layer comprising 60 to 95 percent of synthetic thermoplastic polymer, a long glass fiber mat comprised of fibers having a length of at least 1.5 inches and having a weight ranging from 5 percent to 40 percent, said mat being substantially encased in a matrix of the thermoplastic polymer, said reinforcing layer being essentially free of short glass fibers.

2. The sheet of claim 1 wherein said one layer comprises 45 to 65% of polymer, 10 to 30% of filler and 5 to 25% of short glass, said reinforcing layer comprises 60 to 85% of polymer and 15 to 45% of glass mat.

3. The sheet of claim 2 including a third layer having composition ranges of said one layer, said one layer and said third layer sandwiching said reinforcing layer between them.

4. A process for producing a composite laminated sheet comprising the steps of:
  (a) blending and extruding a first sheet layer comprising from about 40 to 70 percent of thermoplastic polymer, a particulate filler present in an amount up to a maximum of about 50% and 5 to 35 percent short glass fibers having a length ranging from 0.01 to ¾ of an inch and arranged in a plane generally parallel to the sheet surface,
  (b) polishing same in a polished and gauged roll stack,
  (c) blending and extruding a second sheet layer comprising from about 60 to 95 percent of synthetic thermoplastic polymer, but being essentially free of glass fibers,
  (d) feeding said first sheet, said second sheet and a long fiber glass mat, the fibers of which have a length of at least 1.5 inches, into the nip of a set of laminating rolls while the resin of the second sheet is still in a molten condition, the clearance between the rolls being substantially less than the thickness of the sheets and glass mat being fed to the nip of said rolls, whereby the long glass mat is impregnated into said second sheet and said first and second sheets are laminated into a smooth multi-ply product.

5. The process of claim 4 wherein a third sheet having the composition ranges of said first sheet is fed into the laminating rolls to sandwich and laminate the second sheet between said first and third sheets.

6. The composite of claim 2 wherein said first layer is at least 30 mils thick and the thickness of the second sheet is at least 20 mils per ounce per square foot of glass fiber mat.

7. The process of claim 4 wherein the amount of short glass blended in step (a) is from 5 to 35 percent.

8. The process of claim 7 where the amount of filler blended in step (a) is from 10-30 percent.

9. The process of claim 7 wherein the temperature of the second sheet ranges from 10° to 70° C. above the melting point of the polymer at the point of introduction to the laminating rolls.

10. A process for producing a composite laminated sheet, comprising the steps of:
  (a) Blending and extruding a first sheet layer comprising from about 40 to 70 percent by weight of a thermoplastic resin, about 5 to 35 percent by weight of short glass fiber having a length ranging from 0.01 to ¾ of an inch and arranged in a plane generally parallel to the sheet surface, and 10 to 30 percent by weight of particulate filler;
  (b) polishing same in a polished and gauged roll stack;
  (c) blending and extruding a second thermoplastic polymer sheet from a point immediately adjacent to the nip of a set of laminating rolls;
  (d) feeding said first sheet and said second sheet and a long fiber glass mat, the fibers of which have a length of at least 1.5 inches into the nip of said set of laminating rolls, said second sheet being at a temperature between 30 and 100° C. above the melting point of the polymer; the pressure applied by said laminating rolls ranging from 150 to 400 pounds per linear inch and the laminating rolls being maintained at a temperature between 10 to 70° C. below the melting point of the polymer, whereby the glass mat is impregnated into said second sheet and the second sheet is bonded to said first sheet; whereby a strong sheet having at least one substantially smooth surface is produced.

* * * * *

UNITED STATES PATENT AND TRADEMARK OFFICE
CERTIFICATE OF CORRECTION

PATENT NO. : 4,098,943
DATED : July 4, 1978
INVENTOR(S) : E. R. Degginger, et. al.

It is certified that error appears in the above-identified patent and that said Letters Patent are hereby corrected as shown below:

Column 6, line 24, "means" should read --mean--.

Column 7, line 2, "in" should read --is--.

Signed and Sealed this

Sixteenth Day of January 1979

[SEAL]

Attest:

RUTH C. MASON
Attesting Officer

DONALD W. BANNER
Commissioner of Patents and Trademarks